R. E. DRACHENBERG.
STARTING DEVICE FOR AUTOMOBILES.
APPLICATION FILED MAR. 10, 1908.

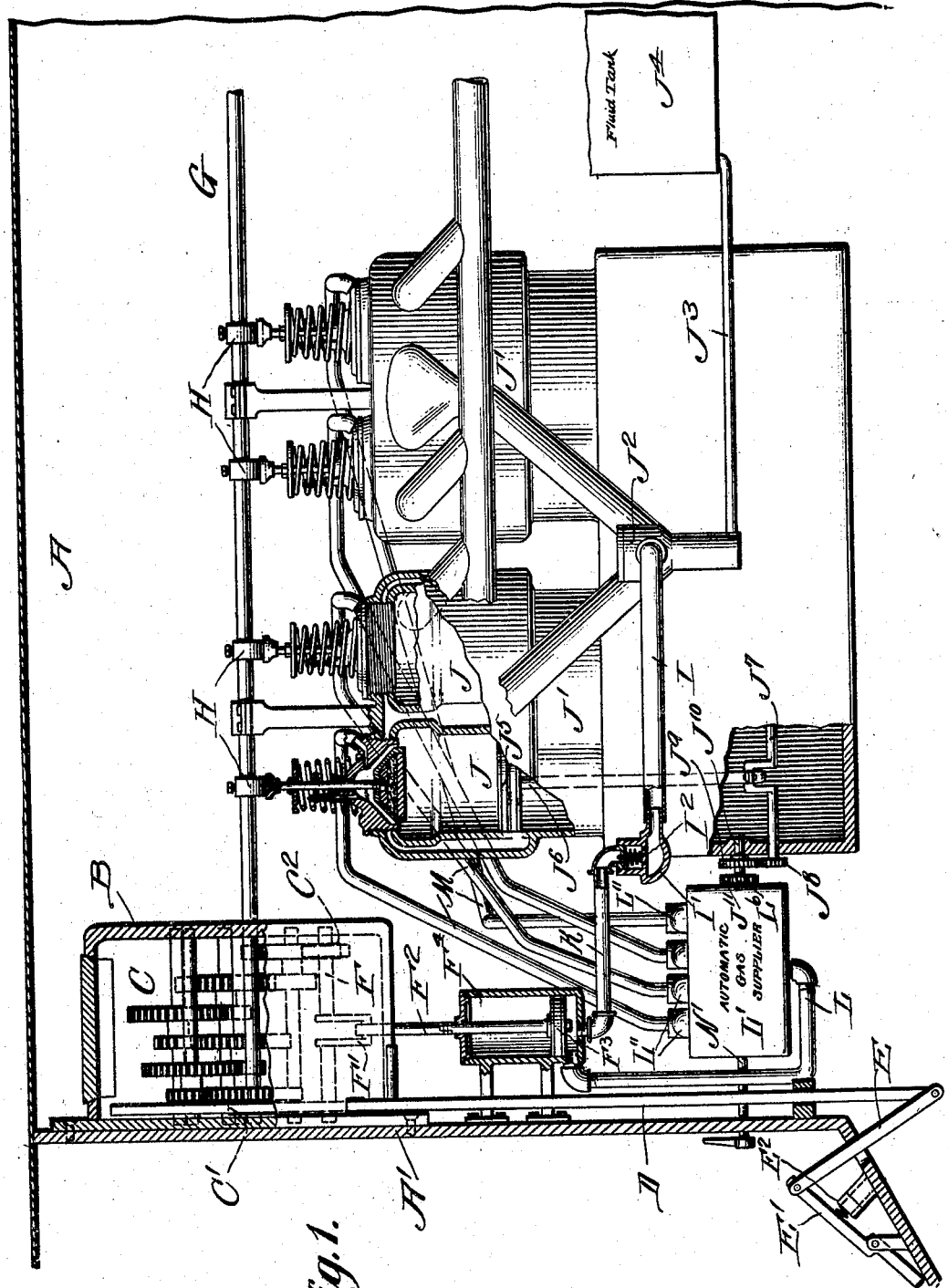

911,480.

Patented Feb. 2, 1909.
4 SHEETS—SHEET 2.

Witnesses
Oliver W. Holmes
E. B. McBath

Inventor
R. E. Drachenberg
By O'Meara & Birch
Attorneys

R. E. DRACHENBERG.
STARTING DEVICE FOR AUTOMOBILES.
APPLICATION FILED MAR. 10, 1908.

911,480.

Patented Feb. 2, 1909.
4 SHEETS—SHEET 3.

Witnesses
Oliver W. Holmes
E. B. McBath

Inventor
R. E. Drachenberg,
By O'Meara & Brock
Attorneys

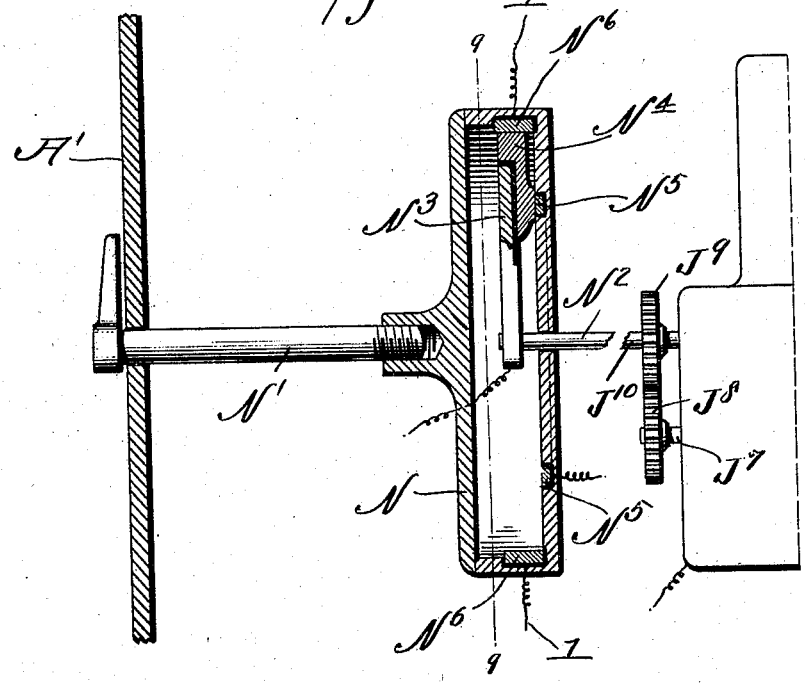
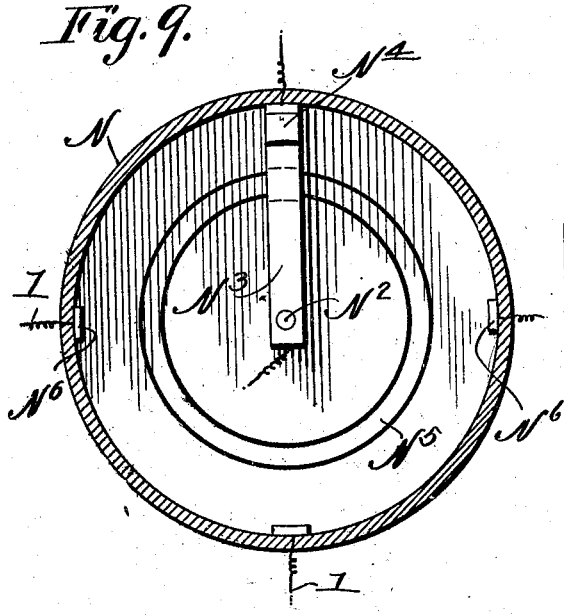
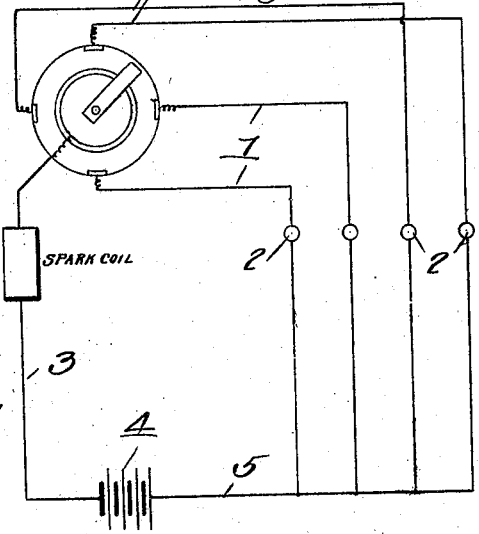

UNITED STATES PATENT OFFICE.

RICHARD E. DRACHENBERG, OF DETROIT, MICHIGAN.

STARTING DEVICE FOR AUTOMOBILES.

No. 911,480.   Specification of Letters Patent.   Patented Feb. 2, 1909.

Application filed March 10, 1908. Serial No. 420,222.

*To all whom it may concern:*

Be it known that I, RICHARD E. DRACHENBERG, a citizen of the United States, residing at Detroit, in the county of Wayne and State of Michigan, have invented a new and useful Improvement in Starting Devices for Automobiles, of which the following is a specification.

This invention relates to a device for drawing initial charges of an explosive gas from the carbureter and then compressing the same and then forcing them to a plurality of cylinders in order to obtain the necessary initial explosion in order to start the engine.

The invention is especially designed for use with automobiles and I have illustrated the same in combination with certain parts of the automobile provided with a four cylinder engine.

Figure 3:
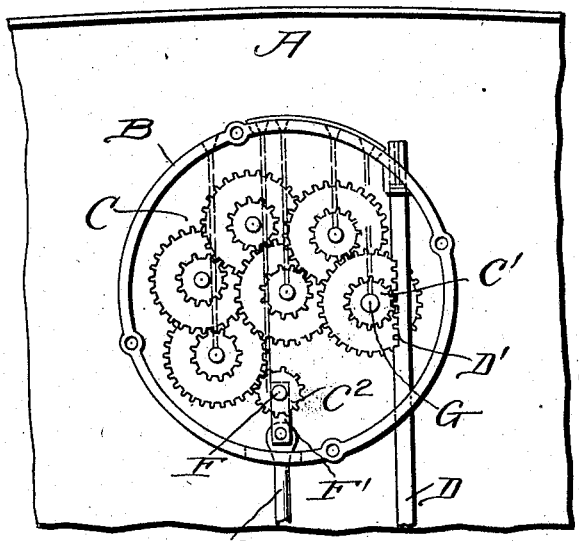
Figure 4:
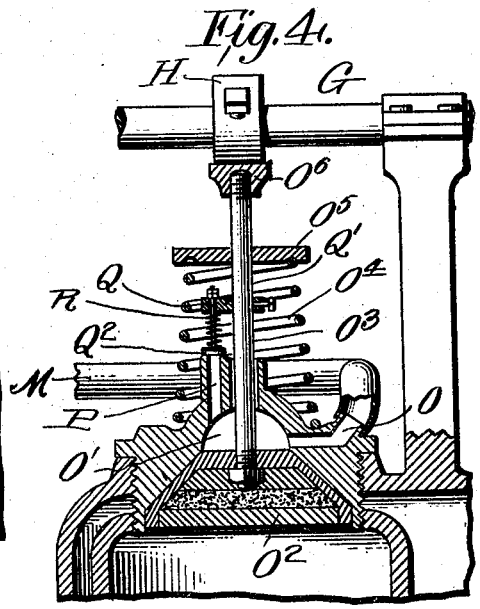
Figure 2:
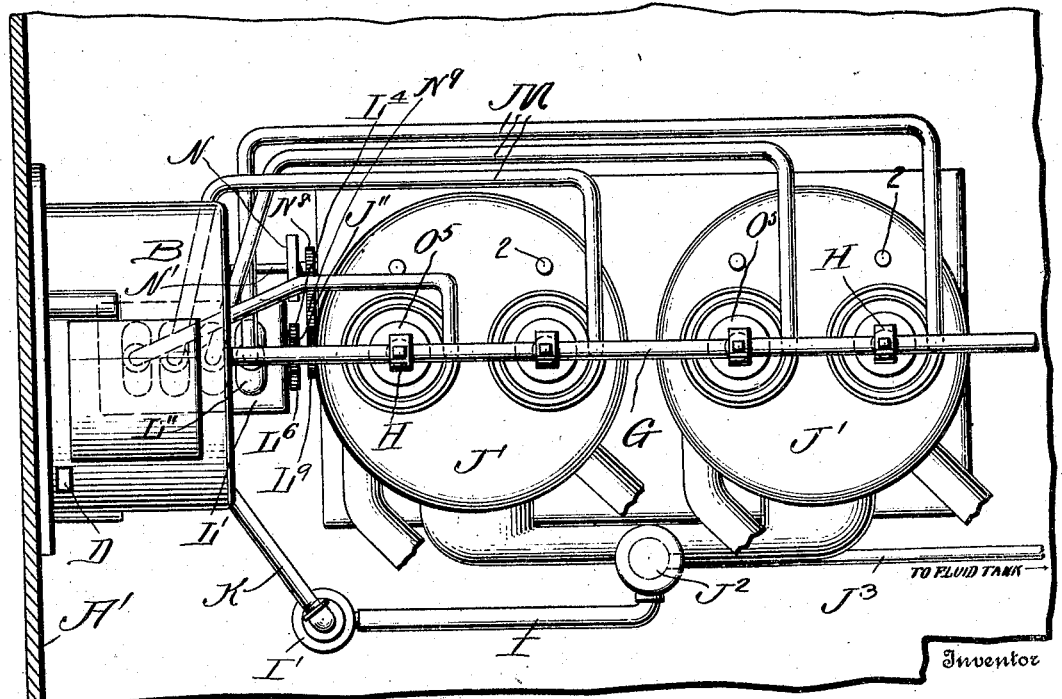
Figure 5:
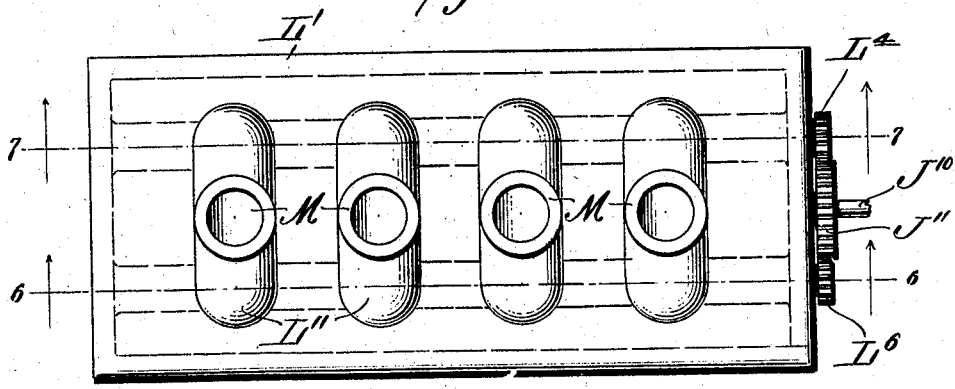
Figure 6:
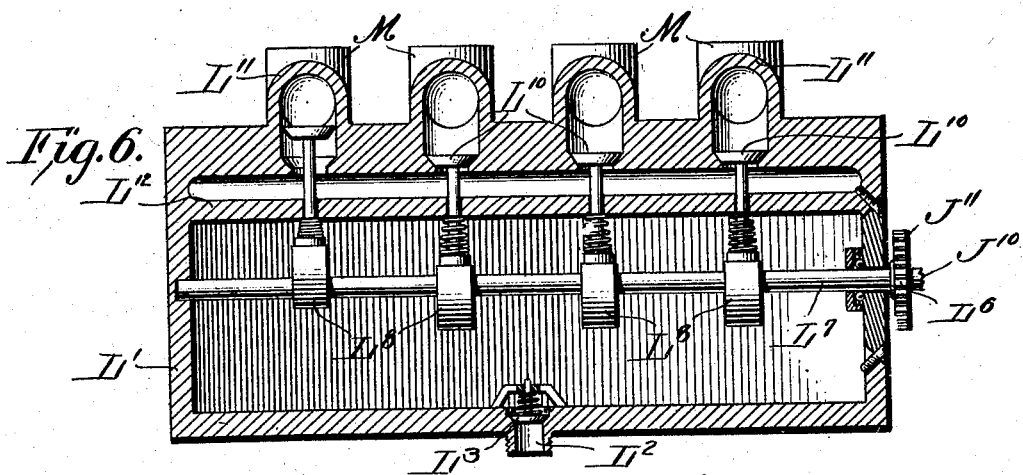
Figure 7:
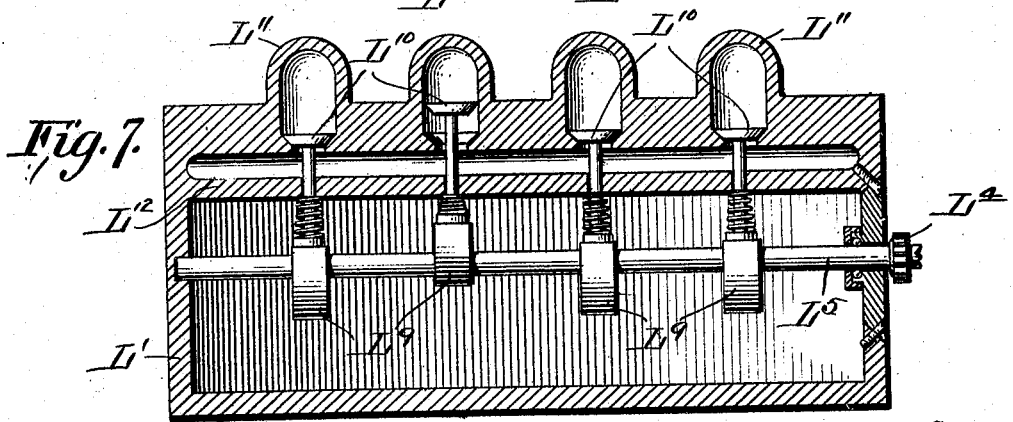

The invention consists of the novel features of construction hereinafter fully described, pointed out in the claims and shown in the accompanying drawings, in which, Figure 1 is a sectional view through the front portion of an automobile showing my invention and adjacent parts partly in section and partly in side elevation. Fig. 2 is a plan view of the cylinders, connecting pipes and adjacent parts, the dash board being in section, Fig. 3 is an elevation of the gear train the connecting parts being broken away. Fig. 4 is an enlarged detail sectional view showing an inlet and controlling valve for one of the cylinders. Fig. 5 is a detail plan view of an automatic gas supplier employed in connection with my starting device. Fig. 6 is a section on the line 6—6 of Fig. 5. Fig. 7 is a section on the line 7—7 of Fig. 5. Fig. 8 is a diametrical section through a circuit making and breaking device, a portion of the dash board being shown in section, and attached parts being in elevation. Fig. 9 is a section on the line 9—9 of Fig. 8. Fig. 10 is a diagrammatic view of the circuit making and breaking device showing the igniting circuits.

In these drawings A represents the casing inclosing the operating mechanism of an automobile and carried in advance of the front seat and dash board A'. Within the casing A is a supplemental casing B in which is arranged a gear train C, said train having at one end a pinion C' and at the opposite end a pinion $C^2$. The gear train is so constructed that a rotation of one-eighth upon a part of the pinion C' will result in eight revolutions of the pinion $C^2$. A rack bar D having a rack portion D' meshes with the pinion C'. The lower end of the rack bar is connected by a link E with a suitable spring pressed foot lever E' arranged immediately below and to the rear of the dash board A'. The pinion $C^2$ is fixed upon a shaft F having a crank portion F' to which is connected a piston rod $F^2$ carrying a piston $F^3$ working in the cylinder $F^4$. The pinion C' is fixed upon the shaft G which carries a plurality of cams H. The shaft G is of course given a partial rotation corresponding to that given to the pinion C'.

I have also shown the engine cylinders J a piston $J^5$ and a piston rod $J^6$, said cylinders being arranged in pairs and each pair being inclosed by a water jacket J'. The usual carbureter $J^2$ is supplied with gasolene through a pipe $J^3$ leading from a tank $J^4$. From the carbureter $J^2$ extends a pipe I in which is arranged an upwardly opening spring pressed check valve $I^2$, working in a valve casing I'. From this casing a pipe K leads and discharges into the bottom of the cylinder $F^4$. From the lower end of the cylinder $F^4$ leads a pipe L which opens into a casing L'. This pipe connects with an inlet $L^2$ formed in the bottom of the casing L' which inlet is controlled by a check valve $L^3$. The piston rods $J^8$ are connected to crank portions of a shaft $J^7$ the outer end of which carries a gear $J^8$ which meshes with a gear $J^9$ carried by a shaft $J^{10}$. The shaft $J^{10}$ is a short stub shaft journaled, respectively, in one end of the engine casing and at the other end in the adjacent end of the casing L' and carries a large gear $J^{11}$ which meshes, respectively, with smaller gears $L^4$ and $L^6$, said last mentioned gears having preferably one-half the number of teeth carried by the gear $J^{11}$. These gears are also mounted, respectively, upon shafts $L^5$ and $L^7$ which extend longitudinally through the casing L' and each of which carries a plurality of cams $L^8$ and $L^9$, forming two sets of cams, there being in my present construction four cams in each set. The cams of each are arranged with respect to each other ninety degrees apart and they act upon the stems of spring pressed check valves $L^{10}$. These valves are seated in the end portions of curved pipes $L^{11}$ mounted upon the casing L' and arranged transversely, the ends of said pipes opening, respectively, in alinement with the shafts $L^5$ and $L^7$. These valves as they open and close control communication between the said chamber and the said pipes. Pipes M leading to the engine cylinders lead from the various pipes L¹¹. Strengthening ribs L¹² are formed on the upper wall of the casing L'.

In Fig. 4 I have shown an enlarged sectional view of the upper portion of one of the engine cylinders and the pipe M leading to said cylinder, discharging into an inlet O which leads to a recess O' formed at the end of the cylinder and cut off from constant communication with the cylinder by means of a conical valve O². A valve stem O³ is provided with a spiral spring O⁴ which presses upon the cylinder rod and also upon a collar O⁵ carried by the stem. The upper end of the valve stem carries a cap O⁶ in engagement with one of the cams H. Leading from the recess O' is a small by-pass P, the upper end of which is normally closed by the valve Q² carried at the lower end of the valve stem Q which works through an adjustable bracket Q' carried by the valve stem O³, and held normally in place by the spring R.

In order to make an operative device I have also shown in diagram in Fig. 10 the circuits for the igniting system and have also shown in detail what I term a distributer, and by means of which the circuit is made and broken at the proper time. This consists of a rotatable casing N fixed upon a shaft N' which extends through the dash board A' and is provided with a suitably operating handle on its rear end. A shaft N² running from the engine and suitably driven in any desired manner, as by the gear J⁸, and the gears N⁸, J⁹, extends into the casing N and carries an arm N³ which carries a contact plate N⁴ which is in sliding contact at all times with a metal ring N⁵ suitably insulated from the casing N. Spaced ninety degrees apart are contact plates N⁶ which are successively engaged by the plate N⁴ as the arm N³ is revolved. The necessary circuits are completed through the wires 1 leading from the plates N⁶, to the sparking plugs 2, and through battery wires 3 and 5 connected, respectively, to the terminals of battery 4, and wire 3 being connected to the contact ring N⁵. When the engine is stopped the pistons usually stop about one-half way between the dead centers, and with the stoppage of the piston no further explosions take place in the cylinders. By means of the handle on shaft N' the casing N can be rotated upon the shaft N² thus bringing the contact plate N⁴ into contact with the plate N⁶ which is electrically connected to the sparking plug in the cylinder in which the next explosion would have taken place if the engine had not stopped, thus at any time after stoppage of the engine resuming operation at the same point.

In operation the pedal E' is pressed down thus moving the rack bar D and giving a one eighth rotation to the pinion C' and imparting eight revolutions to the pinion C². The lifting of the piston F³ sucks a charge of gas from the carbureter which upon downward movement of said piston is compressed and forced into the valve casing L'. As soon as proper pressure is obtained the valve L³ will lift and the gas will pass to the pipes M as the valves L¹⁰ are opened, and through the inlet ports O and into the recess O' of the cylinder head recesses. The rocking of the shaft G will rock the cams H thus forcing down the valve stems O³ and opening the valves O² and the charge will pass into the engine cylinders and be exploded in the ordinary manner. If at any time the pressure in the recess O' becomes too great, the valve Q² will lift thus allowing a portion of the charge to escape. It will be obvious that upon releasing the foot pedal it will be returned to its normal position by the springs E² and this will result in reverse movement of the gear train, the pinion C' can rotate through a distance of one-eighth of a revolution, so that in all the valve L³ will lift eight times and there will be eight suction strokes and eight compressed strokes upon the part of the piston F³ for each downward pressure of the lever E'. It will be noted that two valves upon opposite sides of the casing L are always held in open position by the cams L⁸ and L⁹ and that these valves admit the charge of gas and air into cylinders adjacent to each other, the four cylinders being arranged in sets of two each. By means of this arrangement as the charge is exploded in one cylinder of a set and its piston forced down allowing a new charge to come in, a charge is also being delivered to the other cylinder of the set whose piston is making the up stroke as the piston of the cylinder in which the explosion occurred makes its down stroke.

Having thus fully described my invention, what I claim as new and desire to secure by Letters Patent is:—

1. An internal combustion engine comprising gear train, means operable by the foot for driving said gear train, a combined suction and compression piston actuated by said train, engine cylinders having valves, cams rocked by the gear train, and opening said valves, and a carbureter, the said piston drawing an explosive vapor from the carbureter and delivering the same to the engine cylinders.

2. An internal combustion engine consisting of engine cylinders and a carbureter, a cylinder having valve controlled communication with the carbureter and each of the engine cylinders, a piston working in the said cylinder, a gear train operating said piston, and means operable by the foot for driving the gear train.

3. The combination in an automobile, of a gear train, foot operated means for driving said train, a rock shaft connected with said gear train, cams carried by said shaft, a series of internal combustion engine cylinders, valves controlling admission of gas to said cylinders, said valves being opened by the said cams, and means also operated by the gear train for drawing an initial charge from the carbureter, and delivering the same under pressure to said engine cylinders.

RICHARD E. DRACHENBERG.

Witnesses:
 JOSEPH WILLIAM BRENKERT,
 VOLMER H. SKROBECK.